United States Patent [19]

Bloem

[11] 4,017,276
[45] Apr. 12, 1977

[54] DEOXYGENATION OF WATER

[75] Inventor: Bert Bloem, Waddinxveen, Netherlands

[73] Assignee: The Lummus Company, Bloomfield, N.J.

[22] Filed: June 22, 1976

[21] Appl. No.: 698,317

[52] U.S. Cl. .................................. 55/51; 55/53; 62/29; 203/49
[51] Int. Cl.² ........................................ B01D 19/00
[58] Field of Search ............... 55/44, 47, 49–53, 55/196; 62/29, 30; 203/10, 49

[56] References Cited

UNITED STATES PATENTS

| | | | |
|---|---|---|---|
| 3,132,013 | 5/1964 | Kumamoto et al. | 55/53 |
| 3,267,684 | 8/1966 | Jakob | 62/29 |
| 3,338,061 | 8/1967 | Hvizdos et al. | 62/29 |
| 3,458,972 | 8/1969 | Sood | 55/55 |
| 3,899,099 | 8/1975 | Oiestad | 203/49 |

Primary Examiner—Frank A. Spear, Jr.
Assistant Examiner—R. W. Burks
Attorney, Agent, or Firm—Marn & Jangarathis

[57] ABSTRACT

Seawater is deoxygenated with a nitrogen stripping gas, with the nitrogen stripping gas containing stripped oxygen, being subjected to low temperature fractionation to separate oxygen from the nitrogen. The nitrogen recovered from the fractionation is then recycled to the stripping operation. Air is also employed as feed to the fractionation to provide additional nitrogen and reflux requirements.

8 Claims, 1 Drawing Figure

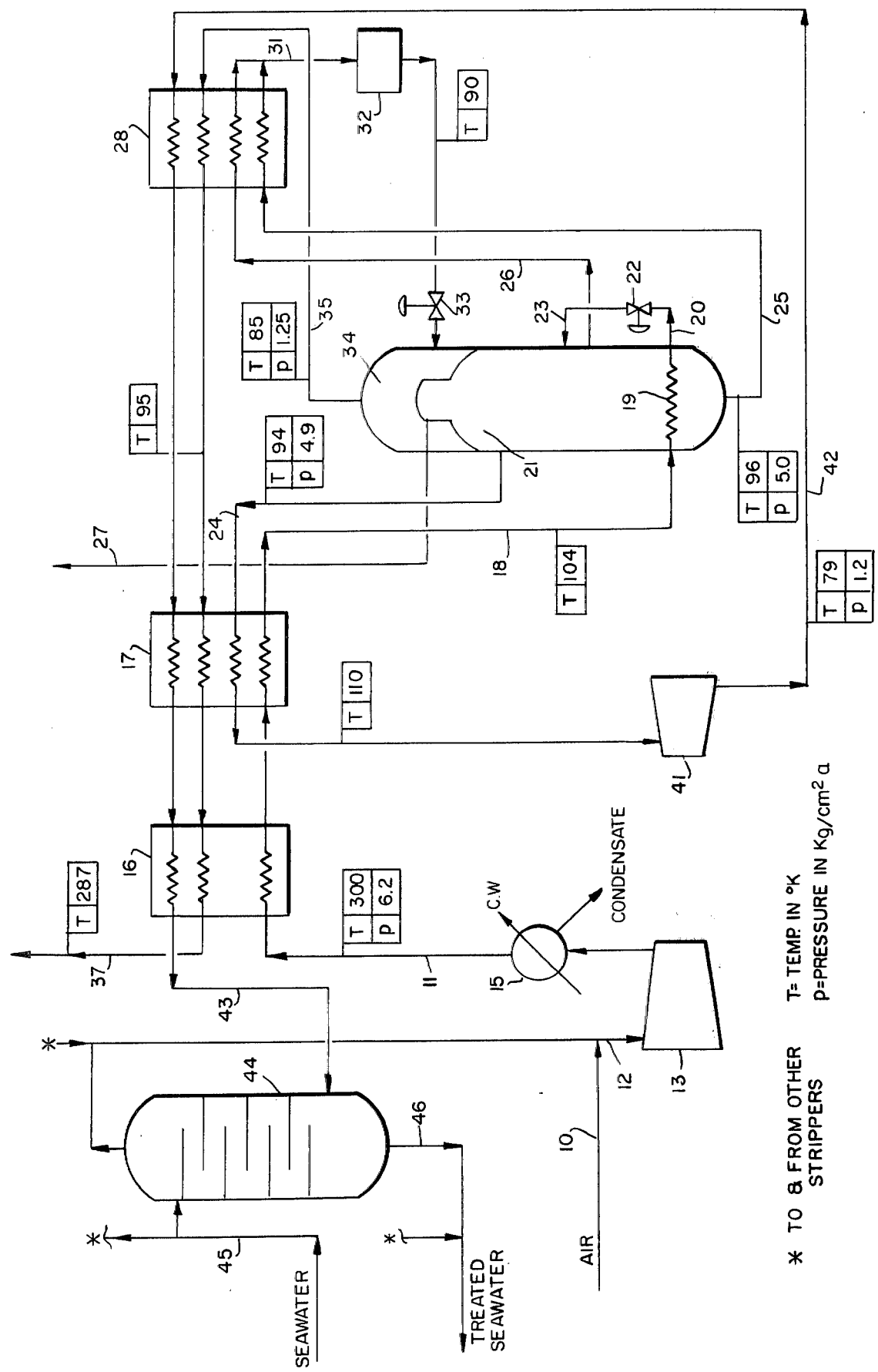

DEOXYGENATION OF WATER

This invention relates to the deoxygenation of water, and more particularly, to the deoxygenation of seawater.

In many operations, it is necessary to deoxygenate water prior to use thereof. Thus, for example, in the use of water; in particular, seawater, for injection into oil wells, it is necessary to remove oxygen prior to the use thereof in order to minimize corrosion and the like. In most cases, such oxygen removal is effected by vacuum deaeration or hydrocarbon stripping. There is a need, however, for improvements in such processes for effecting deoxygenation of water.

The principal object of the present invention is to provide a new and improved process for effecting the deoxygenation of water.

In accordance with the present invention, dissolved oxygen is stripped from water by the use of a nitrogen stripping gas, with the oxygen containing nitrogen stripping gas being recovered and subjected to a fractionation process to recover nitrogen, with the recovered nitrogen being employed as the nitrogen stripping gas. It has been found that an overall process provides for effective deoxygenation of water at reduced cost.

The stripping of oxygen from water; in particular, seawater is generally effected at a temperature in the order of from about 275° K to about 330° K, preferably from about 300° K to about 310° K, and at a pressure in the order of from about 0.8 kg/cm$^2$a to about 1.3 kg/cm$^2$a, preferably from about 1.03 kg/cm$^2$a to about 1.3 kg/cm$^2$a. The stripping is most conveniently effected at the natural temperature of the seawater; however, higher temperatures improve stripping. It is to be understood, however, that the above temperatures and pressures are illustrative of those generally employed for effecting the stripping, and as should be apparent, other temperatures and pressures could be employed within the spirit and scope of the present invention. The selection of temperatures and pressures best suited for a particular operation is within the scope of those skilled in the art from the teachings herein.

The water which is subjected to the stripping operation is generally seawater, and such seawater generally contains oxygen in an amount from about 7.5 ppm to about 12 ppm. The seawater recovered from the stripping operation generally contains no more than about 0.5 ppm of oxygen, preferably 0.15 or less. The nitrogen employed for effecting the stripping contains no more than about 0.5 volume percent of oxygen, preferably no more than about 0.01 volume percent of oxygen, with the oxygen content in most cases being in the order of 0.001 volume percent or less.

The oxygen-containing nitrogen stripping gas recovered from the stripping operation is then subjected to fractionation to separate oxygen therefrom, with the recovered nitrogen being recycled to the stripping operation. In accordance with the preferred procedure of the present invention, air is also introduced into the fractionator, with the additional air feed functioning to provide both nitrogen make-up and an oxygen enriched stream for providing the cooling requirements for the fractionation operation. It is to be understood, however, that in some cases, it may be possible to effect the overall process of the present invention without separate introduction of an air feed.

The invention will be further described with respect to a preferred embodiment thereof illustrated in the accompanying drawing, wherein:

The drawing is a simplified schematic flow diagram of an embodiment of the present invention.

It is to be understood, however, that the scope of the present invention is not to be limited to the embodiment particularly described with reference to the drawing.

Referring now to the drawing, air in line 10 is combined with oxygen-containing nitrogen stripping gas, in line 11, obtained as hereinafter described and the combined stream in line 12 is compressed by compressor 13. The compressed gas in line 14, generally at a pressure in the order of from about 3 kg/cm$^2$a to about 7 kg/cm$^2$a, is cooled in heat exchanger 15, provided with means for removing condensate, such as water, and further cooled in heat exchangers 16 and 17 by indirect heat transfer with various streams, as hereinafter described. The cooled stream from exchanger 17 in line 18 is passed through a coil 19 positioned in the bottom of a low temperature fractionation tower, generally indicated as 21 to provide heat requirements for the fractionator. The further cooled stream withdrawn from coil 19 in line 20 is expanded through a suitable valve 22 and introduced through line 23 into the fractionation tower 21.

The fractionation tower 21 operates to recover, as overhead, nitrogen, and as bottoms, an oxygen enriched fraction. The fractionating tower 21 is generally operated in an overhead temperature in the order of from about 85° K to about 95° K, a bottoms temperature in the order of from about 88° K to about 97° K, and at a pressure in the order of from about 3 kg/cm a to about 5 kg/cm a. Nitrogen overhead is withdrawn from the fractionating tower 21 through line 24, an oxygen rich bottoms is withdrawn through line 25 and an oxygen rich sidestream is withdrawn through line 26. The fractionating tower 21 is further provided with a vent line 27 for periodically venting from the system gases which are lower boiling than nitrogen, such as helium and neon, which may be present in the nitrogen stripping gas recovered from the stripping operation and would otherwise accumulate in the system.

The oxygen enriched streams in lines 25 and 26 are passed through a heat exchanger 28 wherein such streams are cooled by indirect heat transfer, as hereinafter described, with such streams being combined in line 31. The combined streams in line 31 are passed through a hydrocarbon absorber, schematically designated as 32, then expanded through a suitable valve, schematically designated as 33, into an upper section 34 of the fractionating tower 21 to provide cooling requirements for the fractionating tower.

The oxygen enriched stream is withdrawn from section 34 through line 35 and passed through heat exchangers 28, 17, and 16, respectively, to provide cooling requirements therefor, by indirect heat transfer. The oxygen enriched stream withdrawn from heat exchanger 16 is vented to the atmosphere through line 37.

The nitrogen gas withdrawn from fractionating tower 21 through line 24, and containing oxygen in an amount of no greater than 0.5 volume percent, as hereinabove described, is heated by indirect heat transfer in heat exchanger 17 and then expanded through a suitable turbine, schematically indicated as 41, to provide refrigeration capacity at a low temperature, with the expanded gas in line 42 then being further heated in exchangers 28, 17 and 16, respectively. The nitrogen gas withdrawn from heat exchanger 16, in line 43, which is generally at a temperature in the order of from about 270° K to about 290° K, and a pressure in the order of from about 1.1 kg/cm²a to about 2.0 kg/cm²a, is introduced as a stripping gas into a seawater stripper, schematically indicated as 44. Although a single stripper 44 is shown, it should be apparent that the number of strippers employed would be suitable for meeting the seawater requirements of the operation which requires deoxygenated or deaerated seawater.

Seawater in line 45 is introduced into the stripping tower 44 and as a result of the countercurrent contact between the stripping gas and the seawater in tower 44, there is recovered a deoxygenated seawater in line 46. The stripping tower 44 is operated at temperatures and pressures as hereinabove described, with the seawater recovered through line 46 containing amounts of oxygen as hereinabove described, with the oxygen content generally being 0.15 ppm or less.

Stripping gas, which contains oxygen stripped from the seawater, as well as any other gases present in the seawater, such as gases which are lower boiling than nitrogen, and carbon dioxide, is then combined with the air stream in line 10, as hereinabove described, for separation of oxygen therefrom and ultimate recycle to the stripping operation.

The amount of air which is introduced into the system is controlled to provide cooling requirements for the fractionating tower 21, i.e., to provide cooling for condensing reflux in the fractionation tower.

It is to be understood that the scope of the present invention is not to be limited to the hereinabove described embodiment in that numerous modifications thereof are possible within the spirit and scope of the invention. Thus, for example, the separation of oxygen from the nitrogen stripping gas may be effected by a fractionation process other than the one particularly described.

These and other modifications should be apparent to those skilled in the art.

The invention will be further described with respect to the following example; however, it is to be understood that the scope of the invention is not to be limited thereby.

EXAMPLE

In a plant having a capacity for treating 5 million barrels per day of seawater, having an $O_2$ inlet content of 10 ppm and an $O_2$ outlet content of 0.2 ppm, the nitrogen stripping gas is provided at a rate of 17,706 kg/hr, with the oxygen content of the nitrogen stripping gas subsequent to stripping being 325 kg/hr.

Fresh air feed is provided to the system at a rate of 17,375 kg/hr, whereby the total feed to the low temperature fractionator is 35,406 kg/hr.

The temperature and pressures employed in such an operation are indicated in the drawing.

In comparison, if nitrogen stripping requirements are provided by a separate low temperature fractionation, rather than the integrated process of the present invention, the total air feed to the fractionator would be 44,856 kg/hr.

The present invention is particularly advantageous in that it provides for effective removal of oxygen from water, at low equipment and operating costs.

Numerous modifications and variations of the present invention are possible in light of the above teachings and, therefore, within the scope of the appended claims, the invention may be practiced otherwise than as particularly described.

What is claimed is:
1. A process for deoxygenating water, comprising:
   stripping oxygen from the water, said stripping being effected with a nitrogen stripping gas;
   recovering oxygen containing nitrogen stripping gas from said stripping;
   fractionating the oxygen containing nitrogen stripping gas to recover nitrogen; and
   employing recovered nitrogen as stripping gas for said stripping.
2. The process of claim 1 wherein the water is seawater.
3. The process of claim 2 wherein said stripping is effected at a temperature of from about 275° K to about 330° K and a pressure of from about 0.8 kg/cm²a to about 1.3 kg/cm²a.
4. The process of claim 3 wherein the oxygen containing nitrogen stripping gas is combined with air and the combined stream is subjected to said fractionating.
5. The process of claim 4 wherein an oxygen enriched stream is recovered from said fractionating, said oxygen enriched stream being employed to provide cooling requirements for said fractionation.
6. The process of claim 5 wherein the nitrogen stripping gas contains no more than 0.5 volume percent oxygen.
7. The process of claim 6 wherein the seawater prior to stripping contains from about 7.5 to 12 ppm of oxygen and subsequent to stripping contains no more than about 0.5 ppm oxygen.
8. The process of claim 7 wherein the combined oxygen containing nitrogen stripping gas and air stream is employed to provide heat requirements for the fractionation prior to being subjected to the fractionation.

* * * * *